UNITED STATES PATENT OFFICE.

GEORGE BAKER DUNBAR, OF DETROIT, MICHIGAN.

PLASTIC COMPOSITION AND PROCESS OF MAKING SAME.

1,310,180.  Specification of Letters Patent.  Patented July 15, 1919.

No Drawing.  Application filed January 20, 1919. Serial No. 271,952.

*To all whom it may concern:*

Be it known that I, GEORGE BAKER DUNBAR, a citizen of the United States, residing at Detroit, in the county of Wayne and State of Michigan, have invented certain new and useful Improvements in Plastic Compositions and Processes of Making Same, of which the following is a specification.

My invention relates to improvements in plastic composition and process of making same, the composition being particularly designed and adapted for use in molding or pressing into suitable shape various light weight articles which will not only be fire proof, but adapted to resist the action of acids, sudden changes in temperature, and the like.

The primary object of the invention is to provide a generally improved plastic composition particularly adapted for use in the manufacture of a large variety of articles which may be readily molded into shape and which are exposed to the weather while in use.

The improved composition is particularly adapted for use as a filling or covering material for metal parts in protecting the latter from injury or deterioration by the action of various deteriorating elements.

By reason of the above my composition is admirably adapted for use in the manufacture of shell-plugs for temporarily inserting and sealing the interiorly threaded ends of explosive shells until such time as it is desired to insert the firing charge therein.

My improved composition comprises the following ingredients combined in substantially the proportions stated, to wit,—

Resin _____ 60%
Carbon (preferably lamp black) _____ 5%
Mineral fiber (preferably asbestos) _____ 25%
Calcium oxid _____ 10%

If desired calcium carbonate may be substituted for calcium oxid in substantially the proportion stated.

If desired the proportion of mineral fiber may be reduced somewhat, for example, say to 20% and the following ingredients added in substantially the proportions stated:

Shellac _____ 3%
Litharge _____ 2%

The litharge may be added to neutralize the acids and foreign matter in the composition, and the shellac, preferably in the form of gum shellac, may be added to cause the composition to shrink perceptibly while in the molds and thus release the molded material from the molds.

In preparing my improved plastic composition the resin is heated and reduced to a liquid state, and while in such state carbon, preferably in the form of lamp black, is added thereto and thoroughly incorporated therewith, after which the resulting material is heated to a temperature of from 350° to 400° Fahrenheit. At this stage of the process mineral fiber, preferably asbestos, may be added and thoroughly incorporated therewith, such asbestos fiber acting as a binding agent in giving strength and fire proof qualities to the resulting article. I then add calcium oxid or calcium carbonate, which during chemical change, throws out sufficient heat to keep the material plastic until I press it into the molds.

If desired, however, shellac and litharge in substantially the proportions stated, at the time the asbestos fiber is incorporated, may be added, but these ingredients are not essential to the resulting composition.

It should be understood, however, that I do not limit myself to the exact quantities of the various ingredients of my composition, as above enumerated, as it is obvious that the percentage of the various ingredients may be varied within reasonable limits to meet the particular demands or qualities in actual service of the particular article desired, without departing from the spirit of my invention.

Having thus described some of the embodiments of my invention, without having attempted to set forth all the forms in which it may be made or all the modes of its use, what I claim and desire to secure by Letters Patent, is,—

1. A plastic composition, comprising resin, carbon, asbestos, and calcium oxid.

2. A plastic composition, comprising 60% resin, 5% carbon, 25% asbestos fiber, and 10% calcium oxid.

3. The process of making plastic composition, comprising (1) heating resin until reduced to a liquid state, (2) adding carbon thereto and heating to from 350° to 400° Fahrenheit, (3) adding and thoroughly incorporating therewith asbestos fiber, and (4) adding and incorporating therein calcium oxid.

In testimony whereof I have affixed my signature.

GEORGE BAKER DUNBAR.